United States Patent
McCanless et al.

(10) Patent No.: US 9,664,346 B2
(45) Date of Patent: May 30, 2017

(54) LOW-PROFILE LIGHT FIXTURE INTEGRATED WITH AN ARCHITECTURAL PANEL

(71) Applicant: ABL IP HOLDING LLC, Convers, GA (US)

(72) Inventors: Forrest S. McCanless, Oxford, GA (US); Januk S. Aggarwal, Tysons Corner, VA (US); Jack C. Rains, Jr., Oak Hill, VA (US); David P. Ramer, Reston, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 489 days.

(21) Appl. No.: 14/256,113

(22) Filed: Apr. 18, 2014

(65) Prior Publication Data

US 2015/0300583 A1   Oct. 22, 2015

(51) Int. Cl.
| | |
|---|---|
| *F21S 8/02* | (2006.01) |
| *F21V 29/74* | (2015.01) |
| *F21V 23/02* | (2006.01) |
| *G02B 6/00* | (2006.01) |
| *F21V 23/00* | (2015.01) |
| *F21Y 105/00* | (2016.01) |
| *F21Y 101/00* | (2016.01) |

(52) U.S. Cl.
CPC ............... *F21S 8/02* (2013.01); *F21V 23/02* (2013.01); *F21V 29/74* (2015.01); *G02B 6/00* (2013.01); *F21V 23/003* (2013.01); *F21Y 2101/00* (2013.01); *F21Y 2105/00* (2013.01)

(58) Field of Classification Search
CPC .......... F21S 8/02; F21V 29/74; F21V 23/003; F21V 23/02; G02B 6/00

IPC ......................................................... F21S 8/02
See application file for complete search history.

(56) References Cited

U.S. PATENT DOCUMENTS

| | | | |
|---|---|---|---|
| 8,201,968 B2 | 6/2012 | Maxik et al. | |
| 8,246,203 B2 | 8/2012 | Hancock et al. | |
| 2007/0133193 A1* | 6/2007 | Kim | E04B 9/32 362/147 |
| 2008/0019121 A1* | 1/2008 | Ly | F21V 33/006 362/145 |
| 2010/0109567 A1* | 5/2010 | Deurenberg | E04F 13/08 315/294 |

OTHER PUBLICATIONS

Non-final Office Action dated Feb. 17, 2017, issued in U.S. Appl. No. 15/400,257, 12 pages.

\* cited by examiner

*Primary Examiner* — Thomas M Sember
(74) *Attorney, Agent, or Firm* — RatnerPrestia (57) ABSTRACT

A lighting unit includes an architectural panel having an overall thickness that is measured between a first surface that is configured to be exposed to light output by the lighting unit and a second surface that is opposite the first surface, and a light fixture embedded in the architectural panel. The light fixture includes a solid state light source, an optic, a power supply and a driver circuit that at least partially embedded in the recess of the panel. The light fixture is configured to output light in an output direction extending out away from the first surface of the panel. The light fixture extends from the first surface of the panel in a direction opposite the output direction by a distance that is less than the overall thickness of the architectural panel.

21 Claims, 6 Drawing Sheets

LOW-PROFILE LIGHT FIXTURE INTEGRATED WITH AN ARCHITECTURAL PANEL

TECHNICAL FIELD

The present subject matter relates to a low-profile light fixture that is integrated with an architectural panel, such as a wall panel or ceiling tile.

BACKGROUND

Recessed light fixtures and/or flush-mount light fixtures are examples of lighting devices that offer relatively low profiles, from the perspective of occupants of a space illuminated by the fixture (as compared to fixtures that hang from the ceiling or protrude into the space from a wall or the like). In a low-profile lighting application, a light fixture protrudes a minimal distance from the visible surface of an architectural structure, such as a wall or ceiling, to which the light fixture is attached. The power supply for the light fixture, which is hidden from view, protrudes a significant distance from the rear surface of the architectural structure. Thus, to accommodate the power supply for the light fixture, clearance must exist between the rear surface of the architectural structure and the structure to which the architectural structure is attached. Described herein is a low-profile light fixture having an integral power supply, wherein the light fixture does not protrude from the rear surface of the architectural structure.

SUMMARY

Described herein are examples of low-profile light fixtures, each of which is integrated with an architectural panel, such as a ceiling panel, a drop ceiling tile, a wall panel, or a furniture panel, for example.

In an example, a lighting unit comprises an architectural panel having an overall thickness that is measured between a first surface that is configured to be exposed to light output by the lighting unit and a second surface that is opposite the first surface. The lighting unit further comprises a light fixture comprising a solid state light source, an optic, a power supply and a driver circuit. The light fixture, including the source, optic and power supply, is at least partially embedded in the recess of the panel. The light fixture is configured to output light in an output direction extending out away from the first surface of the panel. The light fixture extends from the first surface of the panel in a direction opposite the output direction by a distance that is less than the overall thickness of the architectural panel.

In another example, a lighting unit comprises an architectural panel having an overall thickness that is measured between two opposing surfaces of the architectural panel. The lighting unit further comprises a light fixture including a solid state light source, an optic, a power supply and a driver circuit. The light fixture, including the solid state light source, the optic and the power supply, is at least partially embedded in the panel. The light fixture is mounted to the architectural panel so that none of the solid state light source, the optic, the power supply and the driver circuit protrude beyond both surfaces of the architectural panel.

In yet another example, a lighting unit includes an architectural panel having a recess, and a light fixture comprising a solid state light source, an optic, a power supply and a driver circuit that are each entirely positioned within the recess of the panel.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements. The figures are not drawn to scale, and all of the figures are shown schematically.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings. The various examples disclosed herein relate to a lighting unit including a panel having a low-profile light fixture embedded therein. Reference now is made in detail to the examples illustrated in the accompanying drawings and discussed below.

Figure 1:
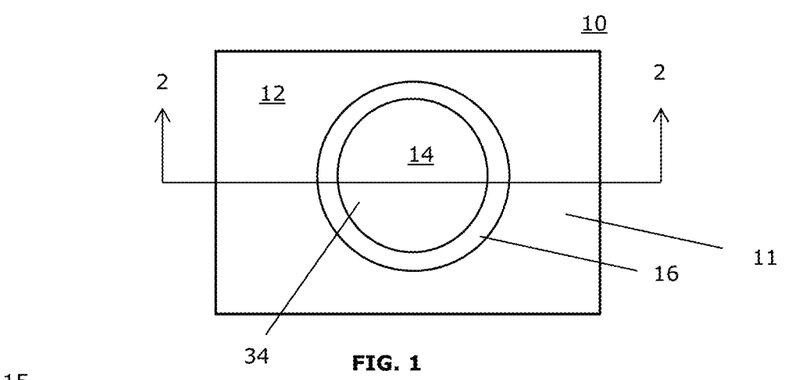
FIG. 1 depicts a top plan view of a lighting unit including a panel having a low-profile light fixture embedded therein.
Figure 2:
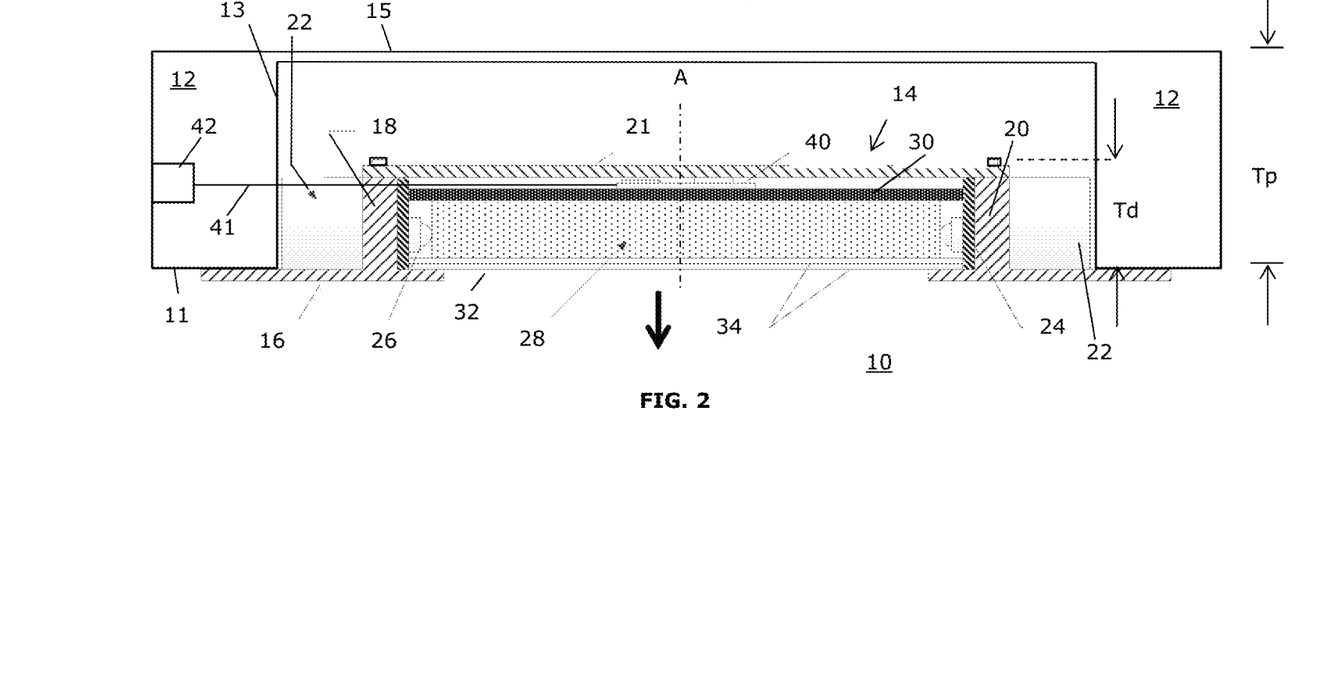
FIG. 2 depicts an enlarged cross-sectional view of the lighting unit of FIG. 1 taken along the lines 2-2.

FIGS. 1 and 2 depict a first example of a lighting unit 10 including an architectural panel 12 having a low-profile light fixture 14 that is embedded in a recess or depression 13 of the panel 12. The depression 13 may be a blind-hole, as shown, or, alternatively, the depression 13 may be a hole that extends through the entire thickness of the panel 12. The panel 12 may be, for example, a ceiling panel, a furniture panel, a drop ceiling tile, a wall panel, a wall board, paneling, or insulation, for example. FIG. 2 shows a cross-sectional view of the panel in an orientation for downlight illumination, for example, with the unit configured for installation in a ceiling or the like. FIG. 1 depicts a plan view of the panel, e.g. as if a person in the illuminated room were looking up at the installed panel in a ceiling. The views are not particularly drawn to scale, either internally or with respect to each other but are shown in a manner to facilitate ease of illustration and explanation.

The panel 12 may be composed of any material, such as Mineral Fiber. The panel 12 may be an otherwise commercially available panel, for example, that is manufactured by the ARMSTRONG® Corporation, which has been machined or otherwise processed to provide the depression 13 (or a hole) into which the light fixture is fitted. The fixture 14 may be fitted into the depression 13 of the panel 12, or, alternatively, the panel 12 may be formed around the fixture 14, whereby the fixture 14 is positioned in a mold tool prior to the panel material being injected into the mold tool. The panel 12 may be ornamented on one or more of its surfaces, particularly the bottom surface 11 of the panel 12 that is visible to a user once it is installed, and on which a bezel 16 of the light fixture 14 is positioned, which is the bottom surface 15 of the panel 12 in the orientation of the unit shown in FIG. 2. The surface 11 of the panel 12 is configured to be exposed to light output by the lighting unit 10. Typically, the panel surface 15 opposite the exposed bottom surface 11 need not be ornamented as it will often not be visible to a person when in the area or space illuminated by the light fixture 14 in the panel 12 even if that person were to look directly at the installed unit 10.

The panel 12 may be square, rectangular, circular; or the panel 12 may have any other shape. Also, the light fixture 14 may present a circular, square, rectangular (non-square) or other shaped light output. The example of FIG. 1 shows a non-square rectangular panel 12 and a light fixture 14 presenting a circular light output opening. In such an example, the bezel 16 may take the form of circular trim ring or other annular element.

The panel 12 has an overall defined thickness "Tp" that is measured between the opposing surfaces 11 and 15. The defined thickness "Tp" may be 0.5 to 1 inch, for example. In the illustrated example, except for the region of the panel having the recess formed therein, the thickness of the panel 12 is substantially constant along the length and width dimensions of the panel 12; although for some installations/applications of the unit 10, the thickness "Tp" of the panel 12 may vary in one or both of those lateral dimensions. It should be understood that the thickness dimension is measured either along or parallel to a longitudinal axis 'A' of the recess 13 of the panel 12 which accommodates the light fixture 14. The thickness dimension of the panel 12 may be the smallest dimension of the panel 12. The thickness "Tp" of the panel 12 may be measured on the panel 12 at a location either near or adjacent the light fixture 14.

The light fixture 14 extends from the first surface 11 of the panel 12 in a direction opposite by a distance "Td" that is equal to or less than the overall thickness "Tp" of the architectural panel 12. The light output direction is represented by the bold arrow in FIG. 2. The distance "Td" may be 0.5 to 1 inch, for example. The distance "Td" is measured either parallel to or along the same axis 'A' as the thickness "Tp" of the panel 12. Further details of the distance "Td" are provided following the description of the individual components of the light fixture 14. Using a ceiling installation by away of an example, in most buildings, significant clearance is required between a ceiling tile and the ceiling to which the tile is attached to accommodate a standard recessed lighting fixture. By maintaining the distance "Td" less than the thickness "Tp" of the panel 12, little or no clearance is required between the panel 12 and a ceiling to which the panel 12 is mounted. Because little or no clearance is required between the panel 12 and a ceiling to which the panel 12 is mounted, ceiling panels can be placed at relatively higher elevations in the building, or, alternatively, the floor height of a new building utilizing panels 12 may be reduced.

The annular bezel 16 of the light fixture example 14 may be mounted to overlap the otherwise exposed surface (lower surface 11 in FIG. 2) of the panel 12, so as to protrude somewhat from the panel 12 into the space to be illuminated, as is shown in FIG. 2. Alternatively, the bezel 16 may be mounted with an exposed surface thereof flush with the exposed surface 11 of the panel 12. To flush mount the bezel 16, the panel 12 may be slightly recessed (i.e., countersunk) to accommodate the bezel 16. Alternatively, the bezel 16 may be omitted to achieve a flush mount configuration.

The round light fixture 14 in the first example includes a housing assembly 18. The housing assembly 18 includes a heat sink body in the form of a cylindrical wall 20 having opposed ends. The bezel 16 is mounted to or integrally formed with one end of the cylindrical wall 20. A circular back plate 21 is mounted to the opposite end of the cylindrical wall 20. The components of the housing assembly 18 may be mounted together by fasteners, welds, adhesive, clips or clamps, for example. One or more components of the housing assembly 18 may be integrated together. For example, the bezel 16 may be integral with the wall 20.

A series of rectangular-shaped heat sink fins 22 extend outwards in a radial direction from the revolved exterior facing surface of the wall 20. The heat sink fins 22 are spaced apart along the circumference of the revolved exterior facing surface of the wall 20. The heat sink fins 22 are shown separated from the panel 12, however, the fins 22 may be embedded in the panel 12. The heat sink fins 22 may be extruded along with the wall 20, or, alternatively, the heat sink fins 22 may be fixed to the wall 20. The fins 22 may be separate elements attached to the housing 18 or formed as integrated elements of the heat sink together with the housing 18.

The material(s) used to form the housing 18 and fins 22 of the heat sink will offer good thermal conductivity. By way of just one example, the housing and fins may be formed of an integrated casting or the like of aluminum. Of course other materials exhibiting suitable thermal conductivity may be used. If integral, the bezel may be formed of the same material. If not integral, the bezel 16 may be formed of a less thermally conductive material, such as plastic.

A flexible circuit board 24 is mounted to the revolved interior facing surface of the wall 20. The circuit board 24 may extend along the entire circumference of the revolved interior facing surface of the wall 20, or a portion thereof. The circuit board 24 is axially located between the bezel 16 and the circular back plate 21.

A plurality of solid state light sources 26 (two shown in the cross-sectional view of FIG. 2) are mounted on the interior facing surface of the circuit board 24. The light sources 26 may be semiconductor light-emitting diodes (LEDs), organic light-emitting diodes (OLED), or polymer light-emitting diodes (PLED), for example. Depending on the size and shape of the light fixture and/or the application of the lighting unit, other sources of suitable size and performance may be used. The light sources 26 may be evenly spaced about the circumference of the circuit board 24.

In the round example of the light fixture 14, the light sources 26 are positioned to emit light generally in a radially inward direction, i.e., toward the longitudinal axis 'A' and the center of the light fixture 14. Typically each light sources 26 such as any of the types of solid state sources noted above emits light about a respective emission access with some angle of dispersion about that axis. In the illustrated orientation, for example, each source 26 will emit some light horizontally toward the center and some light above and below the horizontal. Although not shown, in the views, from perspective above or below the light fixture, each such source 26 will emit some light radially inward toward the center of the light fixture 10 and some light to either side of the respective inward radius. An additional reflector or reflective coating may be provided on regions of inward facing surface of the circuit board 24 not otherwise covered or occupied by the sources 26.

The lighting unit includes an optic located and configured to receive and process light produced by the source(s) and to supply the light via an output, in the desired direction (see bold arrow in FIG. 2) out away from the first surface 11 of the panel 12 of the unit 10. The lighting unit may utilize a variety of different elements or configurations to implement the optic. For example, the optic may take the form of a reflective chamber alone or in combination with a diffuser at the output (optical aperture) of the chamber. Other implementations of the optic may utilize lenses or TIR optical waveguides or the like, with one such optical element associated with a light output of each of the sources.

The example 10 of FIG. 1 includes an optic, in the form of a cylindrically-shaped light guide 28, that is positioned within the circular interior region of the light fixture 14 at a location between the backplate 21 and the bezel 16. In operation, light from the light sources 26 enters the circular perimeter of the light guide 28 so as to edge-light the light guide 28. The light guide 28 may be composed of clear polycarbonate, acrylic, polymethyl methacrylate (PMMA), silicone, glass, or any other suitable material that is known to those skilled in the art.

A reflector disk 30 is positioned on top of the light guide 28 in the downlight orientation example of FIG. 2. The reflector disk 30 and any reflector provided in areas of the circuit board 24 not covered by the sources 26 may exhibit any desired type or degree of reflectivity. In an example, such reflective materials exhibit white defuse reflectivity and a reflectivity of 90% or higher. The reflector disk 30 reflects light that is generated by the light sources 26 in an outward direction, i.e., in the direction of the bold arrow in FIG. 2). The surface of the reflector disk 30 that faces the light guide 28 is a diffuse white surface that directs any light emerging from the light guide 28, which strikes the disk 30, back toward a front opening or aperture 32 of the light fixture 14. The light emerges from the light guide 28 generally in and about the direction of the bold arrow in FIG. 2. The reflected light, and possibly some direct emission from the sources, then pass through one or more lenses 34 (two shown) for diffuse emission from the light fixture 14. The lenses 34 are axially positioned between the bezel 16 and the light guide 28.

The light fixture 14 includes an integral direct current driver and power supply 40. The driver and power supply 40 are attached to the rear facing side of the disk 30, away from the light guide 28. Power may be provided to the driver and power supply 40 by an electrical wire 41 having an electrical connector 42 at its free end or contact that is either embedded in, attached to or positioned on the panel 12. The power may also be routed through a support structure that supports each panel 12. The power may be a 24-volt DC current, which may be considered safe to touch. Although the driver circuitry may be of a type to provide modulated current to the sources 26, in most examples, the driver circuitry supplies DC current of appropriate levels to the sources 26.

The light fixture 14 may be attached to the panel 12 by a friction fit between the heat sink fins 22 and the interior surface of the depression 13 of the panel 12. The light fixture 14 may also be attached to the panel 12 by an adhesive. The adhesive may be applied between a component of the housing assembly 18 (such as the heat sink fins 22 or the backplate 21) and the facing interior surface(s) of the depression 13 of the panel 12. The adhesive could also be applied between the interior facing surface of the bezel 16 and the surface 11 of the panel 12. The light fixture 14 may also be attached to the panel 12 by a retaining device (not shown), such as a fastener, screw, bolt, clip, nut or clamp. The retaining device may couple the bezel 16 to the surface 11 of the panel 12, or the retaining device may couple a component of the housing assembly 18 (such as the heat sink fins 22 or the backplate 21) to an interior surface of the depression 13.

As noted above, the light fixture 14 extends from the first surface 11 of the panel 12 in a direction opposite the light output direction (see arrow in FIG. 2) by a distance "Td" that is equal to or less than the overall thickness "Tp" of the architectural panel 12. The distance "Td" does not account for any component of the fixture 14 that protrudes beyond the surface 11 of the panel 12 toward the area or any object to be illuminated by the unit 10, such as the bezel 16. Hence, in the example, the bezel 16 is not accounted for in the measurement of the total thickness "Td." If the bezel 16 were mounted flush with the surface 11 of the panel 12, however, then the bezel 16 could be accounted for in the measurement of the total thickness "Td." Also, although not shown, if the lenses 34 were to protrude beyond the surface 11 of the panel, for example, then the protruding portion of the lenses 34 would not be accounted for in the measurement of the total thickness "Td."

In the example, a total thickness (also designated by "Td") of the light fixture 14 including at least the solid state light sources 26, the optic 28, and the power supply and driver circuit 40, but excluding the bezel 16, is less than an overall thickness "Tp" of the panel. Also, the distance "Td" by which a portion of the light fixture 14 encompassing at least the solid state light sources 26, the optic 28, and the power supply and driver circuit 40 extends into the panel 12 is less than an overall thickness "Tp" of the panel. The solid state light sources 26, the optic 28 and the power supply and driver circuit 40 are each entirely contained within the recess 13 of the panel 12. The solid state light sources 26, the optic 28 and the power supply and driver circuit 40 can be considered to be entirely contained in the recess 13 of the panel 12, even if the bezel 16 and the lenses 34 protrude beyond the surface 11 of the panel 12.

In the example, none of the solid state light sources 26, the optic 28 and the power supply and driver circuit 40 protrudes from the surface 15 of the panel 12. Also, in the example, none of the solid state light sources 26, the optic 28 and the power supply and driver circuit 40 protrudes from both the surface 11 and the surface 15 of the panel 12. It is conceivable, however, that one or more of the solid state light sources 26, the optic 28 and the power supply and driver circuit 40 could protrude from the surface 11 of the panel 12 without departing from the scope or spirit of the invention.

Figure 3:
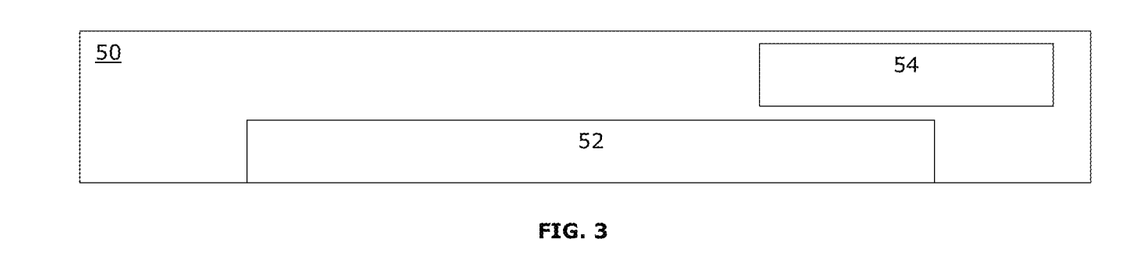
FIGS. 3-5 depict cross-sectional views of other lighting units wherein the electronic and optical sections are located in different positions.
Figure 4:
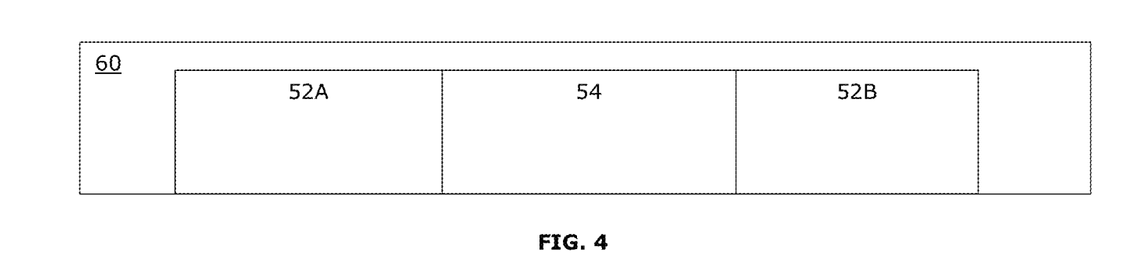
Figure 5:
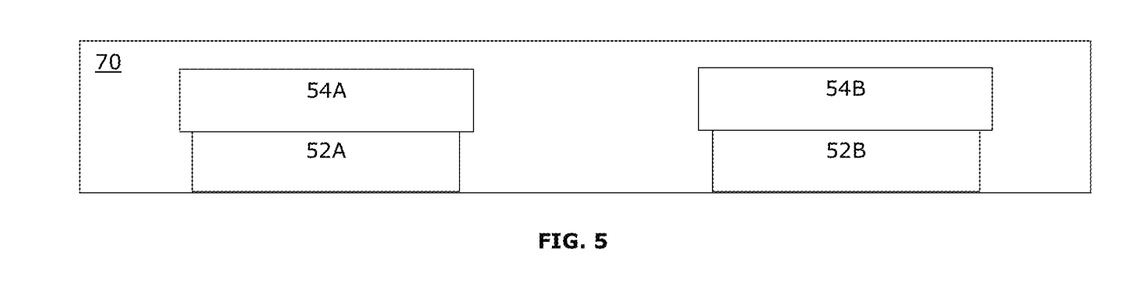

FIGS. 3-5 depict other lighting units wherein the optical section (comprising LEDs, circuit board, light guide, reflector disk and lenses) and the driver and power supply sections of the lighting units are located in different positions.

FIG. 3 shows a block diagram of a lighting unit 50. The configuration of the lighting unit 50 is similar to that of the lighting unit 10, with the exception that the optical section 52 of the light fixture is spaced and separated from the driver and power supply 54 of the light fixture. Otherwise, the lighting units of FIGS. 3-5 are equivalent to the lighting unit of FIGS. 1 and 2.

In the lighting unit 60 of FIG. 4, the driver and power supply section 54 is sandwiched between two separate optical sections 52A and 52B of the light fixture. The driver and power supply section 54 provides power to both optical sections 52A and 52B. Although not shown, each of the optical sections 52A and 52B includes its own circuit board and light sources. Except for being connected to power two separate sets of sources, the driver and power supply circuitry in section 54 may be the same as or similar to circuitry to implement the driver and power supply 40 in the earlier example of FIGS. 1 and 2.

In the lighting unit 70 of FIG. 5, two light fixtures are positioned in the panel. Each light fixture includes an optical section 52A and 52B that is powered by a respective driver and power supply section 54A and 54B, respectively, which may be implemented using circuitry similar to the driver and power supply 40 in the earlier example of FIGS. 1 and 2. It should be understood that a lighting unit may have any number of optical sections, and one or more driver and power supply sections embedded in a respective panel at various locations.

Figure 6A:
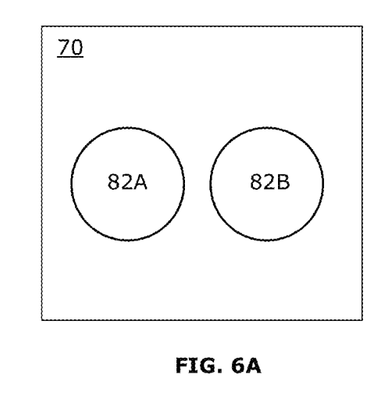
FIGS. 6A-6E depict top plan views of other lighting units having different configurations of one or more light fixtures.
Figure 6B:
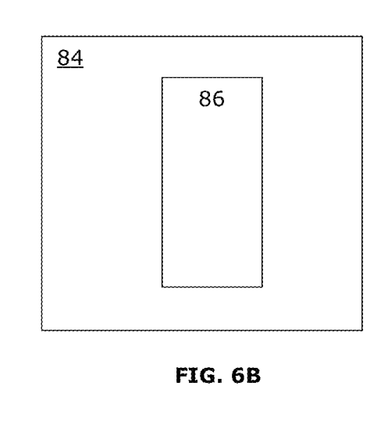
Figure 6C:
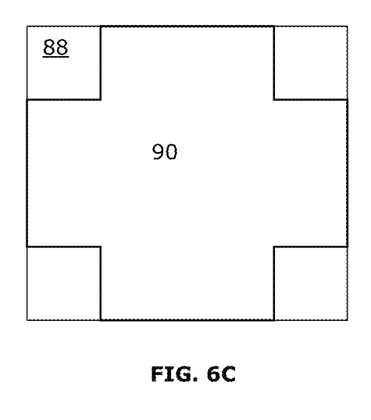
Figure 6D:
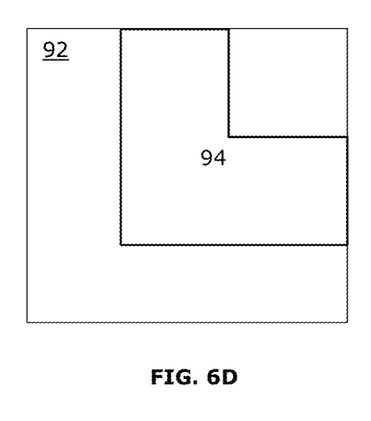
Figure 6E:
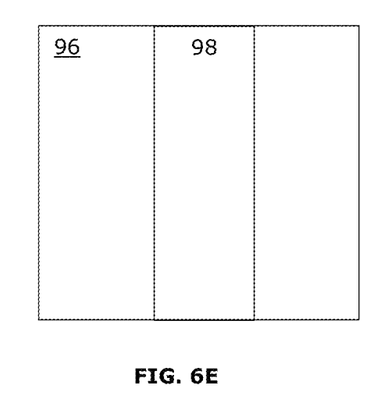

FIGS. 6A-6D depict different configurations for the optical sections of a light fixture of a lighting unit. FIG. 6A, which is a plan view of the lighting unit 70 of FIG. 5, shows two circular-shaped light fixtures 82A and 82B that are spaced apart on the architectural panel (like the panel 12). The shape of the light fixtures may vary. To achieve shapes other than the circular shape that is shown in FIGS. 1 and 6A, the light guide, the reflector disk and the lenses of a light fixture will also have a non-circular shape. For example, in FIG. 6B, the light fixture 86 of the lighting unit 84 has a rectangular shape. Accordingly, its light guide, reflector disk and lenses also have a rectangular shape. In FIG. 6C, the light fixture 90 of the lighting unit 88 has a cross shape such that when multiple panels are positioned together, the light fixtures form a grid. In FIG. 6D, the light fixture 94 of the lighting unit 92 has an "L" shape. In FIG. 6E the light fixture 98 of the lighting unit 96 has an "I" shape. Used together, the light fixtures 94 and 98 can form a grid, pattern, letter, message, or shape, for example.

Figure 7A:
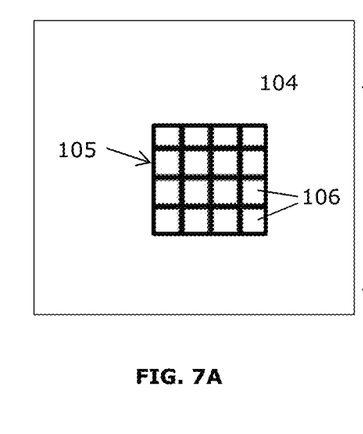
FIGS. 7A and 7B depict top plan and side elevation views, respectively, of a lighting unit having total internal reflection (TIR) light sources.
Figure 7B:
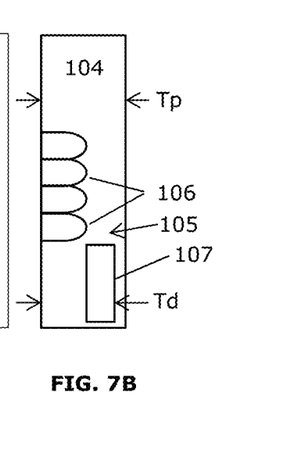

FIGS. 7A and 7B depict top plan and side elevation views, respectively, of a lighting unit 104 including a panel (like the panel 12) and a lighting fixture 105. The lighting fixture 105 includes a plurality of total internal reflection (TIR) light devices 106. As discussed more, later, relative to FIG. 8, each TIR device includes a solid state source and an associated TIR optical element.

Figure 7C:
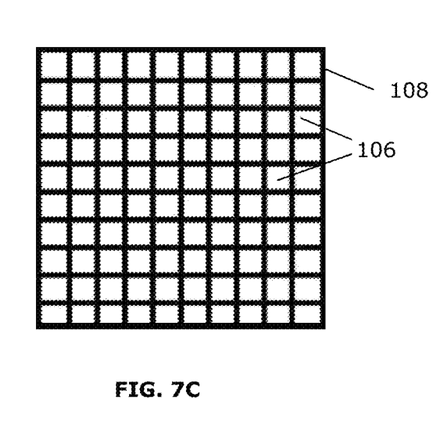
FIGS. 7C and 7D depict top plan views of other lighting units having different configurations of TIR light sources.
Figure 7D:
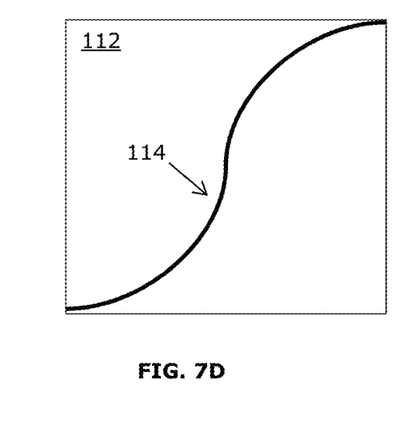

The TIR light devices 106 are powered by a driver and power supply section 107. The light devices 106 in the example of FIG. 7A are positioned in the center of the panel 104 and arranged together in a grid-like fashion. The arrangement of the light sources 106 may vary. For example, as shown in the lighting unit 108 of FIG. 7C, the entire panel can be populated with light sources 106. The light sources can be arranged together to assume any shape. For example, in the lighting unit 112 of FIG. 7D, the light sources 114 are arranged along a curve.

Figure 8:
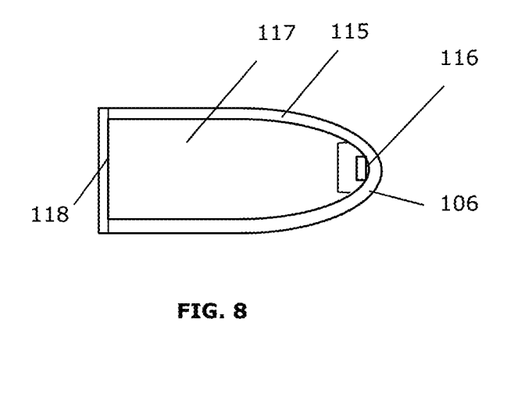
FIG. 8 depicts a cross-sectional side view of an individual TIR light source of the lighting units of FIGS. 7A-7D.

FIG. 8 depicts a cross-sectional side view of an individual TIR light device 106 of the lighting units of FIGS. 7A-7D. The light device 106 generally includes a bullet-shaped reflector housing 115 having a reflective surface on its interior, a solid state light source in the form of an LED 116 that is positioned at the base of the housing 115, an optic in the form of a light guide 117 that is positioned within the housing 115, and a lens in the form of a liquid crystal diffuser 118 positioned on the open end of the housing 115. The materials forming the optic 117 and the housing 115 are different; and the optical index of refraction of the material of the optic 117 is different from the optical index of refraction of the material of the housing 115. The change in optical index of refraction at this interface of materials of the optic 117 with the housing 115 will reflect light within the optic, by total internal reflection, if the angle of incidence of light impacting the interface is less than a characteristic angle determined by the difference in refractive indices. Although light reaching the interface at a large incident angle may pass through the interface, total internal reflection redirects light that is incident on the interface at less than the characteristic angle for total internal reflection. The extent of total internal reflection may be increased if the inner surface of the housing at the interface is somewhat or even highly reflective.

In a configuration like that shown in FIG. 8, light emitted along the axis passes from the solid state light source 116 to the lens 118, and the TIR redirects light that is initially emitted somewhat off-axis back within the optic until the redirected light also emerges via the lens 118.

Like the lighting unit 10, a total thickness "Td" of the lighting fixture 105 including at least the solid state light source 116, the optic 117, and the power supply and driver circuit 107, is less than an overall thickness "Tp" of the panel 104. Also, the solid state light source 116, the optic 117, and the power supply and driver circuit 107 are all embedded in the panel 102 and do not protrude from the outer surfaces of the panel 104.

Figures 9A, 9B:
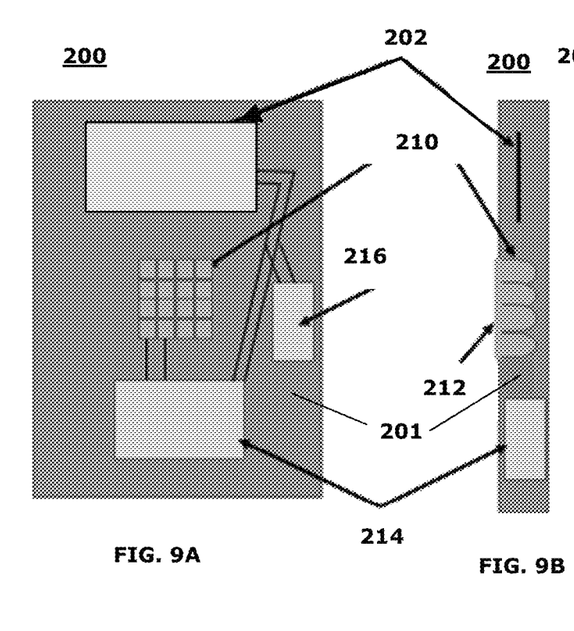
FIGS. 9A and 9B depict top and side cross-sectional views, respectively, of a lighting unit having a non-contact power receiver.

FIGS. 9A and 9B depict top and side cross-sectional views, respectively, of a lighting unit 200. The lighting unit 200 is similar to the lighting unit 104 of FIGS. 7A and 7B and only the differences between those lighting units will be described hereinafter. Unlike the previously described lighting units, the lighting unit 200 wirelessly receives power from a power source, thus, it is not directly connected to a power source.

Figure 9C:
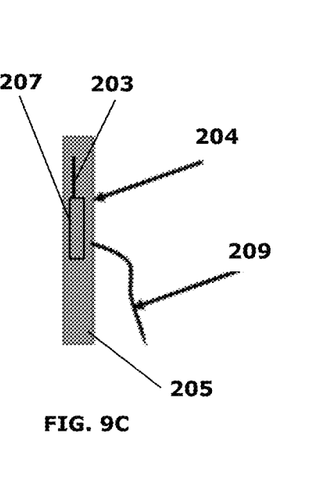
FIG. 9C depicts a side cross-sectional view of a non-contact power transmitter for powering the lighting unit of FIGS. 9A and 9B.

The lighting unit 200 includes a non-contact power receiver 202 that wirelessly receives power from a non-contact power transmitter 203 of a non-contact power transmitter assembly 204 that is shown in FIG. 9C. The non-contact power transmitter assembly 204 may be positioned outside of and adjacent to one or more lighting units 200 to wirelessly transmit power to the one or more lighting units 200. Alternatively, the non-contact power transmitter assembly 204 could be contained within the panel of a single lighting unit to power one or more other lighting units 200.

The non-contact power transmitter assembly 204 of FIG. 9C generally comprises a housing 205. A power supply 207 is positioned within the housing 205 and has wiring or a power cord 209 that is electrically connected to an AC or a DC power source (not shown). A non-contact power transmitter 203 positioned within the housing 205 is electrically connected to the power supply 207 to receive power therefrom. The power supply 207 may convert the power received from the power source (not shown) to DC power or to a particular level and/or frequency of AC for use by the non-contact power transmitter 203. In operation, the non-contact power transmitter 203 wirelessly transmits power that is received by the non-contact power receiver 202 of the lighting unit 200 of FIGS. 9A and 9B for powering the light source 210 of the lighting unit 200.

The lighting unit 200 generally comprises an architectural panel 201 and a non-contact power receiver 202 that is either positioned on or embedded within the panel 201. In the lighting unit 200, a power supply 214 is electrically connected to the non-contact power receiver 202 for converting power received from the non-contact power receiver 202 to power that is useable by the light source 210. For example, the supply 214 may convert an AC signal of a particular frequency provided from the receiver 202 into DC at a level and current appropriate to drive the type and number of LEDs forming the particular implementation of the light source 210.

In the example, the lighting unit may also include a battery 216 that is electrically connected to the non-contact power receiver 202. The battery 216 is configured to store power that is received by the non-contact power receiver 202. The battery 216 is an optional feature of the lighting unit 200 and may be omitted. The power supply 214 and the battery 216 may be at least partially embedded in the panel 201, as shown. When power is not available via the non-contact power receiver 202 the battery 216 can supply power as needed to operate one or more of the LEDs of the light source 210.

The light source 210 in the example comprises a matrix of square-shaped TIR light devices and an edge-lit panel 212 that is positioned over the TIR light devices. It should be understood that the light source 210 is not limited to the TIR light devices and edge-lit panel that are shown in FIGS. 9A and 9B, and the source 210 could be any of the light sources that are described herein.

Figure 10:
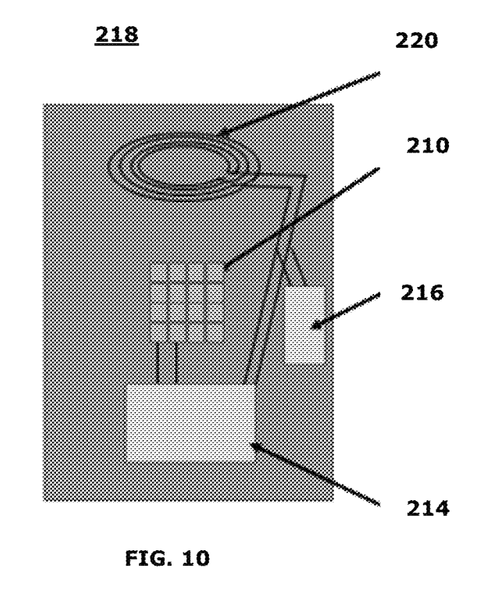
FIG. 10 depicts a top cross-sectional view of a lighting unit having a non-contact power receiver including an inductive loop.

According to one example, the non-contact power receiver 202 is an inductive loop. FIG. 10 depicts a top cross-sectional view of a lighting unit 218, like the lighting unit 200 of FIGS. 9A and 9B, having a non-contact power receiver in the form of an inductive loop 220. In such an example, the non-contact power transmitter 203 of the non-contact power transmitter assembly 204 of FIG. 9C is also an inductive loop. While the inductive loop of the power transmitter assembly 204 is not explicitly shown in FIG. 9C, it should be understood that the inductive loop would look similar to the inductive loop 220 that is shown in FIG. 10, although some characteristics, such as shape and numbers of turns, may vary between the loop of the transmitter and the loop of the receiver. Power is transferred inductively over some distance between the loops.

In another example, the non-contact power transmitter 203 is a light source, and the non-contact power receiver 202 is a photovoltaic element that is configured to receive the light transmitted by the non-contact power transmitter 203 and convert the received light to electricity for powering the light source 210.

In yet another example, the non-contact power transmitter 203 is a heat source, and the non-contact power receiver 202 is a thermoelectric element that is configured to receive the heat transmitted by the non-contact power transmitter 203 and convert the received heat to electricity for powering the light source 210.

In still another example, the non-contact power transmitter 203 is a mechanical vibration source, and the non-contact power receiver 202 is a piezoelectric element that is configured to receive the mechanical vibrations transmitted by the non-contact power transmitter 203 and convert the received vibrations to electricity for powering the light source 210.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:
1. A lighting unit comprising:
an architectural panel having an overall thickness that is measured between a first surface that is configured to be exposed to light output by the lighting unit and a second surface that is opposite the first surface; and
a light fixture comprising a solid state light source, an optic, a power supply and a driver circuit, the light fixture including the source, optic and power supply being at least partially embedded in a recess of the panel, said light fixture being configured to output light in an output direction extending out away from the first surface of the panel,
wherein the light fixture extends from the first surface of the panel in a direction opposite the output direction by a distance that is less than the overall thickness of the architectural panel,
wherein the light fixture further comprises a heat sink housing in which the solid state light source, the optic, the power supply and the driver circuit are positioned, wherein said heat sink housing includes heat sink fins for conducting heat generated by the solid state light source, and wherein the heat sink fins are embedded in the panel.
2. The lighting unit of claim 1, further comprising electrical connection and wiring for the light fixture incorporated into the panel.

3. The lighting unit of claim 1, wherein the power supply and the driver circuit are enclosed in a housing of the light fixture, and the housing of the light fixture is embedded in the panel.

4. The lighting unit of claim 1, wherein the light fixture does not protrude from the first surface of the panel.

5. The lighting unit of claim 1, wherein the optic is contained within a housing, and a change in optical index of refraction at an interface between the optic and the housing reflects light that is incident on the interface by total internal reflection.

6. The lighting unit of claim 1, wherein the optic has a non-circular shape.

7. The lighting unit of claim 6, wherein the optic has a square, rectangular, cross, L, or curved shape.

8. The lighting unit of claim 1, wherein a longitudinal axis of the lighting unit is defined through the recess, wherein thickness of the panel and thickness of the light fixture are measured either along or parallel to the longitudinal axis.

9. The lighting unit of claim 1, wherein the light fixture does not protrude beyond the second surface of the panel in a direction opposite the output direction.

10. The lighting unit of claim 1, wherein the heat sink housing includes a bezel that is positioned against the first surface of the panel.

11. The lighting unit of claim 10, wherein the heat sink housing includes a back plate that is positioned opposite the bezel, and the solid state light source, the optic, the power supply and the driver circuit are all positioned between the back plate and the bezel of the heat sink housing.

12. The lighting unit of claim 1, wherein the architectural panel is a ceiling panel, a drop ceiling tile, a wall panel, or a furniture panel.

13. A lighting unit comprising:
an architectural panel having an overall thickness that is measured between a first surface that is configured to be exposed to light output by the lighting unit and a second surface that is opposite the first surface; and
a light fixture comprising a solid state light source, an optic, a power supply and a driver circuit, the light fixture including the source, optic and power supply being at least partially embedded in a recess of the panel, said light fixture being configured to output light in an output direction extending out away from the first surface of the panel,
wherein the light fixture extends from the first surface of the panel in a direction opposite the output direction by a distance that is less than the overall thickness of the architectural panel, and
another light fixture comprising another solid state light source and another optic, the another light fixture including the another solid state light source and the another optic being at least partially embedded in another recess of the panel, said another light fixture being configured to output light in an output direction extending out away from the first surface of the panel,
wherein the another light fixture extends from the first surface of the panel in a direction opposite the output direction by a distance that is less than the overall thickness of the architectural panel.

14. The lighting unit of claim 13, wherein said another light fixture includes another power supply and another driver circuit for powering said another light fixture.

15. The lighting unit of claim 13, wherein said another light fixture is powered by the power supply and the driver circuit of said light fixture.

16. A lighting unit comprising:
an architectural panel having an overall thickness that is measured between two opposing surfaces of the architectural panel; and
a light fixture comprising a solid state light source, an optic, a power supply and a driver circuit, the light fixture including the solid state light source, the optic, the power supply and the driver circuit being at least partially embedded in the panel, the light fixture being positioned within a bezel having a shoulder that is mounted to one of the two opposing surfaces of the panel,
wherein the light fixture is mounted to the architectural panel so that none of the solid state light source, the optic, the power supply and the driver circuit protrude through both surfaces of the architectural panel.

17. The lighting unit of claim 16, wherein the power supply and the driver circuit are enclosed in a housing of the light fixture, and the housing of the light fixture is embedded in the panel.

18. The lighting unit of claim 16, wherein the optic is contained within a housing, and a change in optical index of refraction at an interface between the optic and the housing reflects light that is incident on the interface by total internal reflection.

19. A lighting unit comprising:
an architectural panel having one or more recesses;
a light fixture comprising a solid state light source, an optic, a power supply and a driver circuit that are each entirely positioned within a recess of the panel; and
a non-contact power receiver positioned either in or on the architectural panel for wirelessly receiving power from a non-contact power transmitter.

20. The lighting unit of claim 19, wherein the non-contact power receiver includes an inductive coil that is configured to wirelessly receive power from an inductive coil of the non-contact power transmitter.

21. The lighting unit of claim 19, wherein the non-contact power receiver is selected from the group consisting of an inductive loop, a photovoltaic element, a thermoelectric element, and a piezo-electric element.

* * * * *